United States Patent [19]

Cavalleri et al.

[11] Patent Number: 5,072,891
[45] Date of Patent: Dec. 17, 1991

[54] COMBINATION ACTUATOR AND COOLANT SUPPLY FOR MISSILE AND ROCKET VECTOR CONTROL

[75] Inventors: Robert J. Cavalleri; Harvey J. Readey, both of Orlando, Fla.

[73] Assignee: Applied Technology Associates, Orlando, Fla.

[21] Appl. No.: 440,108

[22] Filed: Nov. 22, 1989

[51] Int. Cl.5 .................. F42B 10/02; F42B 10/66
[52] U.S. Cl. ................... 244/3.21; 244/3.22; 244/3.27; 244/117 A; 60/231; 239/265.17; 239/265.23
[58] Field of Search ............ 244/3.21, 3.22, 3.27, 244/21, 10, 90 A, 113, 117 A; 60/230, 231; 239/265.19, 265.23, 265.37, 265.41, 265.15, 265.17

[56] References Cited

U.S. PATENT DOCUMENTS

| | | | |
|---|---|---|---|
| 2,941,759 | 6/1960 | Rice et al. | 244/117 A |
| 2,971,327 | 2/1961 | Moy et al. | 239/265.17 |
| 3,140,065 | 7/1964 | Alvarez-Calderon | 244/21 |
| 3,182,450 | 5/1965 | Widell et al. | 60/231 |
| 3,246,468 | 4/1966 | Wilhite | 60/230 |
| 3,465,966 | 9/1969 | Fuentes et al. | 239/265.23 |
| 3,759,466 | 9/1973 | Evers-Euterneck | 244/3.21 |
| 4,384,694 | 5/1983 | Watanabe et al. | 239/265.23 |
| 4,867,393 | 9/1989 | Faupell et al. | 244/3.22 |
| 4,903,917 | 2/1990 | Peller et al. | 244/3.27 |

Primary Examiner—Michael J. Carone
Attorney, Agent, or Firm—H. Jay Spiegel

[57] ABSTRACT

The present invention relates to a strut assembly which may be selectively projected and retracted with respect to associated structure of a solid or liquid propellant rocket of missile, with such structure comprising one of, for example, a nozzle thereof or the body thereof. The invention struct may be projected either internally of the nozzle or externally of the missile body, as desired. Projection and retraction of the strut are accomplished through use of fluid actuation means, the fluid mode of means of which comprises coolant which is also directed in various locations on the inventive strut assembly to cool the strut assembly and to protect it and adjacent structures from particulate impaction, heat and thermal damage, etc.

14 Claims, 3 Drawing Sheets

COMBINATION ACTUATOR AND COOLANT SUPPLY FOR MISSILE AND ROCKET VECTOR CONTROL

BACKGROUND OF THE INVENTION

The subject matter of this patent application constitutes an improvement over the subject matter disclosed and claimed in co-pending U.S. patent application Ser. No. 07/355,360 filed May 23, 1989 now abandoned, titled Fluid Shielded Movable Strut for Missile and Rocket Thrust Vector Control, filed in the name of co-inventor Robert Cavalleri of this patent application. The entirety of the specification, claims and drawings of the above-mentioned co-pending United States patent application are hereby incorporated by reference herein.

The above-mentioned patent application discloses a strut assembly which may be selectively projected and retracted with respect to the associated structure of a solid or liquid propellant rocket or missile, with the structure to which the strut is attached comprising one of the nozzle thereof or the body thereof. The strut disclosed in the co-pending United States patent application is disclosed as being projectable either internally of the nozzle or externally of the body as desired. The actuator consists of a piston slidably mounted in a cylinder and carrying the inventive strut. Hydraulic fluid is supplied to the cylinder via a four port reversing valve which controls extension and retraction of the strut. Separate coolant supply is provided from a separate coolant reservoir from which coolant is supplied to the strut through the piston, piston rod and through an internal passageway and chamber within the strut itself.

Subsequent to the invention of the strut disclosed in the above-mentioned co-pending United States patent application, Applicants discovered that it might be advantageous to combine the coolant supply and strut control aspects into a single integrated structure. Such an invention is advantageous over the prior strut device disclosed in the co-pending patent application since the improved structure saves weight and complication.

In particular, combining the strut actuator and coolant supply into a single apparatus eliminates the need for a separate coolant reservoir, a separate coolant pump, a separate coolant supply control valve and separate flow passageways to supply the coolant to the strut. Since it is extremely vital and important to save as much weight as possible in a rocket or missile, the savings in weight by elimination of these components is extremely significant.

SUMMARY OF THE INVENTION

The present invention relates to a combination actuator and coolant supply for missile and rocket thrust vector control. The present invention includes the following interrelated aspects and features:

a) In a first aspect, the inventive device consists of a strut extendable and retractable through the force of pressurized fluid.

b) In an important aspect of the present invention, the pressurized fluid consists of a coolant thus combining strut control with cooling function into a single aspect.

c) A remotely actuable valve controls extension and retraction of the strut. When the strut is retracted, carefully designed leakage paths exist to allow slow leakage of coolant through the system to facilitate maintenance of cooling therethrough.

d) The above-described valve consists of a supply and exhaust port allowing supply to a chamber behind the strut to extend the strut and exhaust of fluid pressure from behind the strut to the atmosphere via a filter device to allow the strut to be retracted.

(e) In a further aspect, a specifically designed geometric leakage path is provided so that according to the theory of hydrodynamic lubrication, the coolant prohibits the strut from contacting the stationary housing.

Accordingly, it is a first object of the present invention to provide an improved combination actuator and coolant supply for missile thrust vector control.

It is a further object of the present invention to provide such a device wherein the coolant is used to extend and retract a thrust vector control strut.

It is a yet further object of the present invention to provide such a device having leakage paths which are open at all times to allow maintenance of cooling function and to provide a fail safe device for either a manned or unmanned vehicle such that the thrust vector control system fails in retracted position or, if so desired, the geometry can be arranged in concert with a spring such that the strut will not initiate extension until a minimum coolant supply pressure is achieved and the strut can be biased in the direction of either an extended or retracted position.

These and other objects, aspects and features of the present invention will be better understood from the following detailed description of the preferred embodiment when read in conjunction with the appended drawing figures.

BRIEF DESCRIPTION OF THE PREFERRED EMBODIMENT

Figure 1:
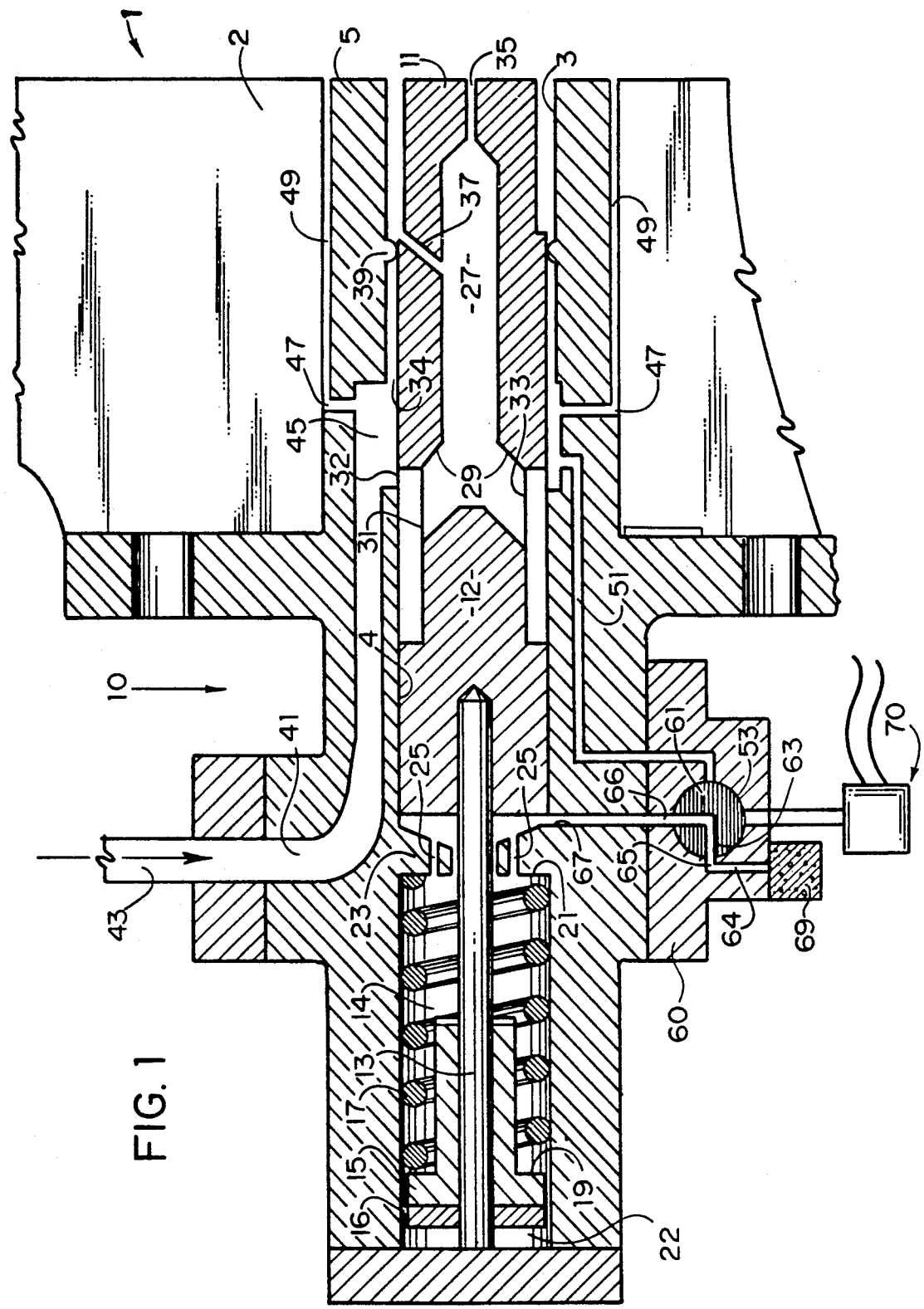
FIG. 1 shows a cross-sectional view of the inventive strut as retracted within the vehicle body.
Figure 2:
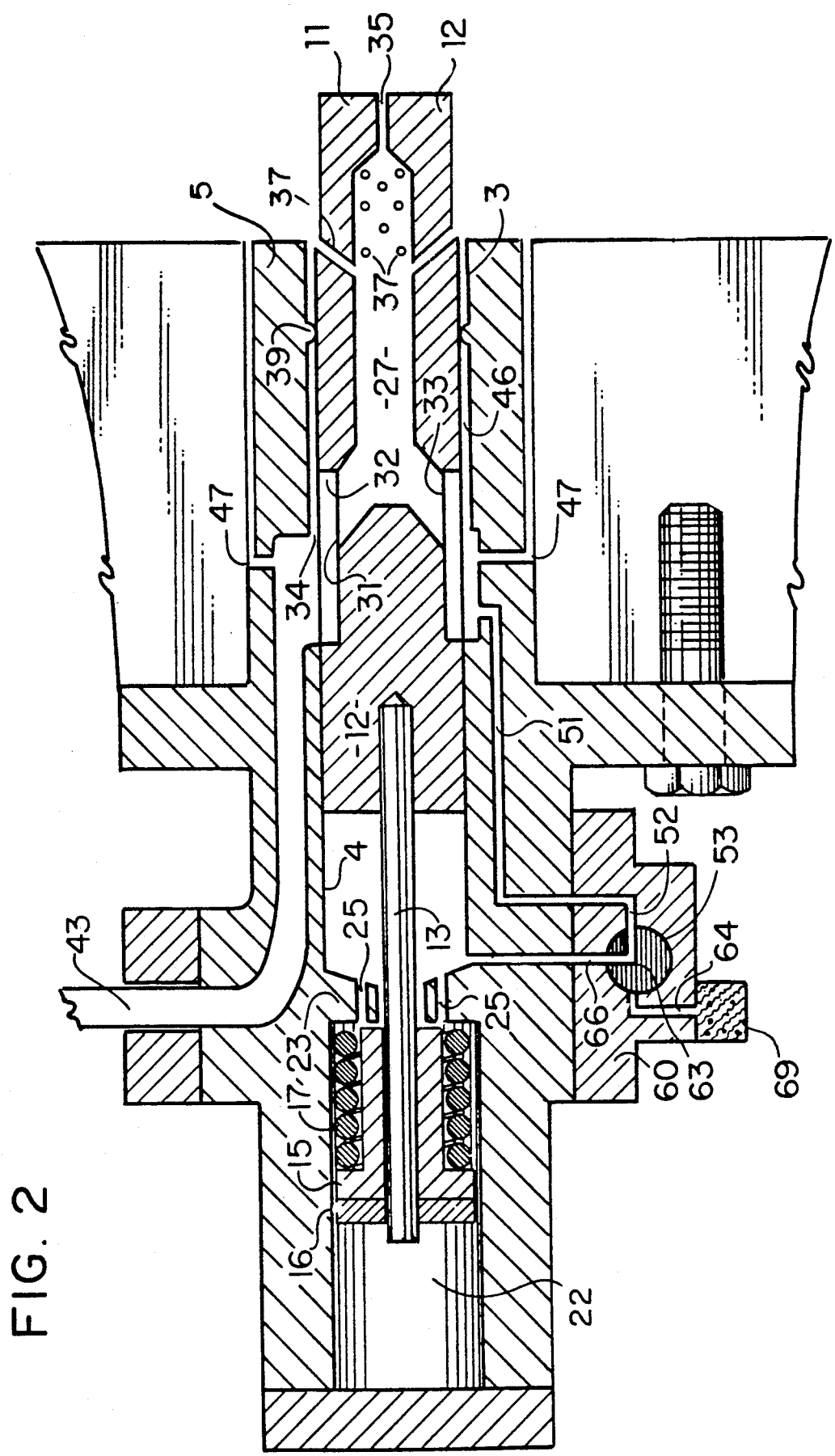
FIG. 2 shows a cross-sectional view of the strut illustrated in FIG. 1, however with the strut extended.

With reference, first, to FIGS. 1 and 2, the inventive strut assembly is generally designated by the reference numeral 10 and is seen to be mounted within the casing 2 of a projectile 1 such as, for example, a rocket or missile. As was disclosed in the related co-pending application Ser. No. 07/355,360 now abandoned, it is intended that a plurality of strut assemblies such as the strut assembly 10 shown in FIGS. 1-3 be contained within the projectile 1 circumferentially spaced thereabout. For ease of explanation, only a single such strut is illustrated in the drawings; however, it is stressed that the present invention contemplates a plurality of circumferentially spaced strut assemblies, preferably at least four in number about the circumference of the projectile 1 body 2.

With further reference to the figures, it is seen that the body 2 of the projectile 1 includes an opening 3 in which the complete strut assembly 10 is received. The strut assembly 10 includes a strut member 11 mounted on a stem 13 which has connected thereto a piston member 15 which is spring biased in the left-hand direction in FIGS. 1 and 2 by virtue of compression spring 17 carried between the shoulder 19 of the piston 15 on the one hand and a shoulder 21 of the strut housing 5. The shoulder 21 is formed on an annular inwardly projecting portion 23 of the housing 5, which portion 23 includes a plurality of circumferentially spaced orifices 25 for a purpose to be described in greater detail hereinafter.

The strut member 11 includes an internal chamber 27 having inlet passages 29 allowing access thereto, which inlet passages 29 are fluidly connected to an annular port 31. The chamber 27 is fluidly connected to passage 33 and outlet passage 35 as well as to a plurality of laterally directed outlet passages 37 best seen in FIG. 2.

The strut assembly 10 includes an annular inwardly extending protrusion 39 in the housing 5 which is specifically sized and configured to provide a small gap between the protrusion 39 and the strut member 11. In the preferred embodiment of the present invention, this gap should be on the order of 0.001 inch. The housing 5 includes a further opening 4 which is concentrically centered with the opening 3 and which slidably receives a proximal end 12 of the strut member 11, which proximal end 12 mountingly receives the stem 13.

The strut assembly 10 which mounts to the projectile 1 includes an internal passageway 41 which connects at a proximal end with a conduit 43 and at a distal end thereof with annular port 45 which may be completely aligned with the port 31 of the strut member 11 or may be partially misaligned with respect thereto. The passageway 41 is provided to carry coolant/motive fluid to the strut 10. The port 45 also fluidly communicates with leakage passages 47 which allow slow leakage of coolant/motive fluid therethrough to provide cooling to adjacent regions of the body 2.

The strut assembly 10 also has an internal passageway 51 which interconnects between the port 45 on the one hand and a chamber 53 on the other hand which comprises a valve chamber for the valve 60.

The valve 60 may be of the spherical or cylindrical type, or alternatively, a conical or truncated conical valve may be employed. As shown in FIGS. 1 and 2, the valve 60 includes a body 61 having an L-shaped passageway 63 therethrough. The L-shaped passageway 63 of the valve member 61 may communicate in various positions thereof with the part 52 of the passageway 51, the port 65 of the exhaust passageway 64 and the port 66 of the passage way 67.

The exhaust passageway 64 communicates with the atmosphere via an optional filtering or check valve device 69. The passageway 66 communicates with the spring chamber 14 via the passageways 25 in the portion 23. With the valve 60 in the position shown in FIG. 2, a flow path is created including a conduit 43, passageway 41, port 45, port 33 around the chamber 27, passageway 51, port 52, L-shaped passageway 63, port 66, passageway 67, passageways 25, spring chamber 14 and leakage annulus 16 around the piston 15 to the portion 55 of the spring chamber 22 on the left-hand side of the piston in the view of the figures.

As should be understood by those skilled in the art, the imbalance which exists between the area of the piston on the left-hand side thereof as compared to the area on the right-side from which must be subtracted the area of the stem 13 causes overcoming of the forces of the spring 17, friction and any thrust generated by coolant exhausting through 74, 37 and 35 when the pressure on the left-hand side of the piston 15 exceeds a desired level. Such imbalance will cause the piston 15 to move against the above-mentioned forces in the right-hand direction of FIGS. 1 and 2 to the position shown in FIG. 2 where the strut member 11 is extended also allowing direct exposure of the outlets of the passageways 37 and 35 so that the strut performs its functions while the coolant performs its cooling function.

As should be understood, FIG. 1 shows a schematic representation of a solenoid actuator 70 which may operate in a manner well known to those skilled in the art from remote control to control actuation of the valve 60 between its two operative positions respectively shown in FIGS. 1 and 2. FIG. 1 depicts the valve 60 in its exhaust position while FIG. 2 shows the valve 60 in its supply position. In the exhaust position shown in FIG. 1, fluid within the spring chamber 14 may be exhausted to the atmosphere via the passageway 67, port 66, valve passageway 63, port 65, exhaust passageway 64 and filter device 69. In the supply position of the valve 60 depicted in FIG. 2, fluid supply to the spring chamber 14 has been explained hereinabove.

Figure 3:
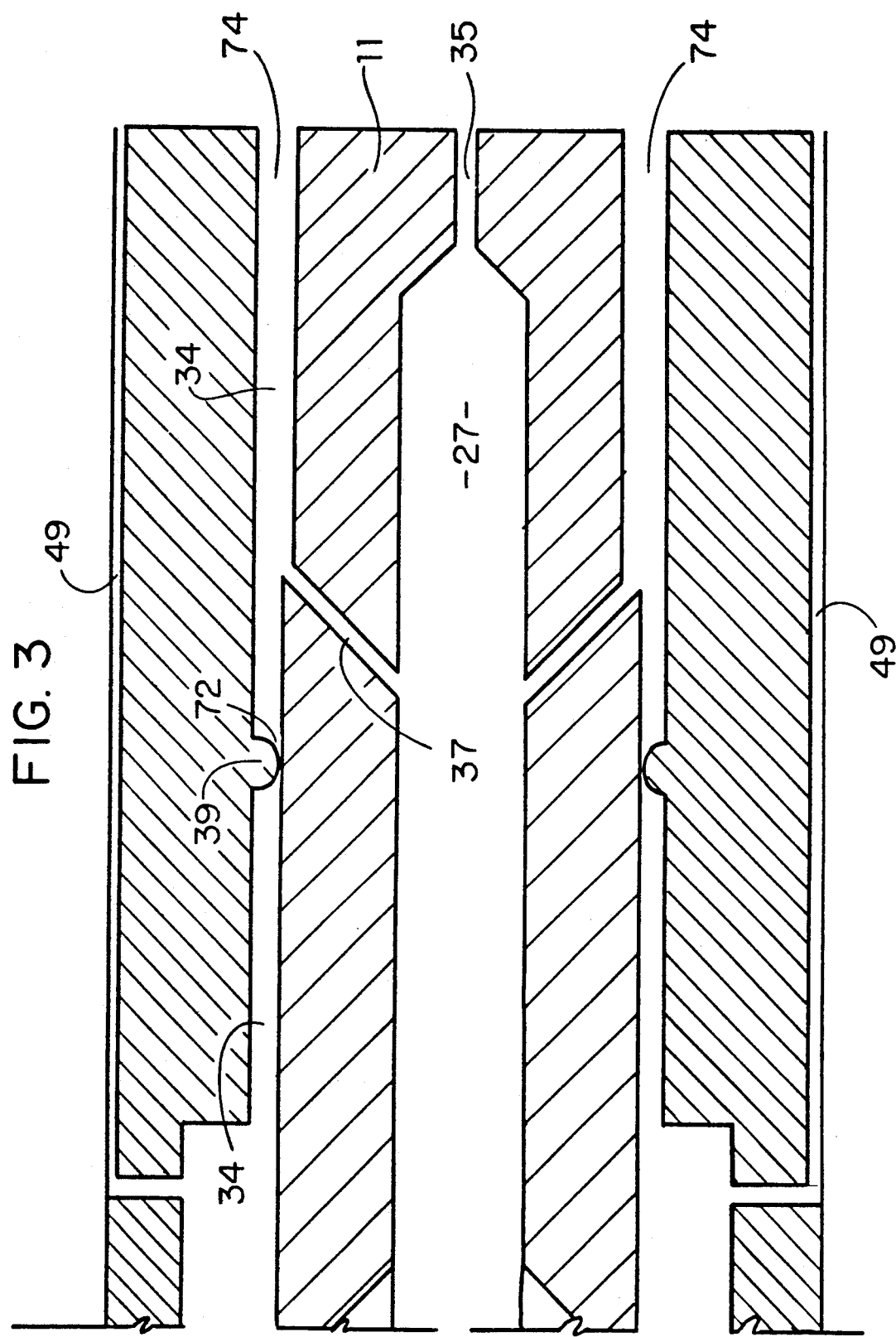
FIG. 3 shows an enlarged cross-sectional view of the chamber in which the strut reciprocates.

FIG. 3 is an enlarged view of a portion of the structure illustrated in FIGS. 1 and 2. FIG. 3 shows the annular protrusion 39 with respect to the strut member 11 to clearly show the gap 72 therebetween which is provided to allow fluid in the passageway 41 and the port 45 to bleed therepast during all phases of operation of the inventive device 10. A second function of gap 72 is to provide a pressure distribution according to the theory of hydrodynamic lubrication so that the coolant prevents strut 11 from contacting annular protrusion 39. Control means (not shown) are provided to control the supply of pressurized coolant through the conduit 43 and thence to the passageway 41 and other aspects of the flow system of the present invention. When the valve 60 is in the position shown in FIG. 1 with fluid having exhausted from the spring chamber 14 out the exhaust passage 64 and with the spring 17 having moved the piston 15 in the left-hand direction in the figure to cause retraction of the strut member 11, the above-described control means is activated to reduce the pressure of coolant within the passageway 41 to a desired degree. However, pressure in the passageway 41 is not completely negated so coolant fluid is always present within the passageway 41 at some small degree of pressure so that coolant is continuously supplied to passages 34 and 49 for reasons to be explained subsequently.

In the retractive position of the strut member 11 as seen in FIG. 1, a slight gap 34 exists between the outer walls of the strut member 11 and the inner walls of the strut housing 5. Similarly, a slight gap 32 between the port 45 and the port 31 also exists as seen in FIG. 1. These gaps allow fluid flow even in the retracted position of the strut member 11 shown. The orifice 32 formed by port 31 acts as a means of modulating the coolant flow when the valve is in the retracted position.

In particular, coolant fluid may flow in the gaps 34 and 49 and past the small gap 72 between the protrusion 39 and outer wall of the strut member 11 and thence out the annular exit port 74 defined between determination of the retracted strut member 11 and the inner wall of the housing 5 located in the body 2 of the projectile 1. In this way continuous slow diffusion of coolant fluid may occur to keep the outer extremity of the strut member 11 as retracted cooled.

At the same time, coolant in the passageway 41 may leak through the gap 32 between the port 45 and 33 and thence into the chamber 27 of the strut member 11, whereupon coolant fluid may leak through the passageways 35 and 37 and thence outside the projectile 1 to perform a similar cooling function. With reference to FIGS. 1 and 2, it should also be understood that in the retracted position of the strut member 11 shown in FIG. 1, slight fluid flow may occur out the passageway 37 and thence along the gap 34 to the port 74 to also facilitate the cooling function described above. At the same time, coolant may leak through the passageways 47 and 49 to cool portions of the body 2 radially separated from the inventive device housing 5. The purpose of coolant passage 49 is to prevent heat soak into the body 2 at the assembly interface. Such heat soak, if not controlled, can result in structural, mechanical or thermal failure of the inventive device 10.

In the preferred embodiment of the present invention, a gaseous coolant such as helium is one preferred gaseous coolant to be used, and a liquid coolant such as water/glycol mixture is a preferred phase changing coolant. Helium has a good thermal capacity and does not dissociate at the temperatures which exist in a nozzle exhaust stream. However, other coolants may be employed including high pressure gas from a solid propellant gas generator or some other coolant which is able to withstand the temperatures and pressures involved.

In the preferred embodiment of the present invention, the strut member 11 may be made of a suitable high temperature material which may resist the temperature fluctuations in a projectile nozzle. Such materials may include metal, phenolic, graphite, ceramic, or some composite.

In a further aspect of the present invention, as was explained above, the preferred embodiment of the present invention contemplates continuous flow through the gap 34 between the strut member 11 and the strut housing 5 and gap 49 between the housing 5 and body 2 of the projectile 1. This continuous flow is intended not only to provide the cooling function described above, but also is intended to prevent hot exhaust products and heat caused by hot exhaust gases from flowing into the region of the actuator for the strut member 11, which heat could cause overheating of the actuator or binding due to thermal expansions.

As should be understood from the above explanation, the inventive device 10 effectively combines a fluid injection technique with the presence of a solid body strut member 11 to achieve a missile guidance or thrust vector control system possessing highly desirable attributes. Combining of coolant for both cooling and strut extension and retraction purposes saves weight and space on the associated projectile 1. Use of the inventive device 10 results in reduced drag penalty and weight penalty and volume penalty than would be the case with the use of external fins and flexible nozzle seals or liquid injection thrust vector control techniques. Elimination of component requirements for movable nozzles increases simplicity, reduces cost and increases reliability.

As such, an invention has been disclosed in terms of a preferred embodiment thereof which fulfills each and every one of the objects of the invention as set forth hereinabove and provides a new and improved combination actuator and coolant supply for missile and rocket thrust vector control of great novelty and utility. Of course, various modifications and alterations in the teachings of the present invention may be contemplated by those skilled in the art without departing from the intended spirit and scope thereof. As such, it is intended that the present invention only be limited by the terms of the claims.

We claim:

1. In a projectile having a body and flying through forces supplied by propulsion means having at least one nozzle, a strut mounted on said projectile and movable between a first retracted position and a second extended position by actuator means, and supply means for supplying coolant to said strut through a passageway having an adjustable orifice including a radial port in said strut, the improvement comprising said supply means also supplying said coolant to said actuator means for extending and retracting said strut said adjustable orifice enlarging as said strut is moved toward said extended position.

2. The invention of claim 1, wherein said actuator means comprises a piston connected to said strut and slidably mounted in a cylinder and said coolant is supplied to one side of said piston to move said piston.

3. The invention of claim 2, further including biasing means for biasing said strut in a direction of retraction thereof.

4. The invention of claim 3, wherein said biasing means engages one face of said piston, said coolant being supplied to a chamber adjacent another face of said piston to move said piston against biasing force of said biasing means to extend said strut.

5. The invention of claim 4, further including a flow path between said supply means and said chamber and having valve means therein.

6. The invention of claim 5, wherein said valve means is movable between a first position allowing supply of coolant to said chamber and a second position allowing exhausting of said chamber.

7. The invention of claim 6, further including a vent connected to said chamber in said second position.

8. The invention of claim 1, wherein said strut has an internal chamber in fluid communication with said supply means.

9. The invention of claim 8, wherein said internal chamber includes at least one exit orifice allowing coolant to bleed from said internal chamber and out of said strut.

10. The invention of claim 9, including a multiplicity of exit orifices.

11. The invention of claim 9, wherein said at least one exit orifice comprises a plurality of exit orifices allowing coolant to bleed through and around said strut.

12. The invention of claim 1, including a plurality of struts.

13. The invention of claim 1, wherein said strut is mounted to extend exterior of said body.

14. The invention of claim 1, further including a coolant passage between said strut and said projectile body, said coolant passage being fluidly connected to said supply means.

* * * * *

UNITED STATES PATENT AND TRADEMARK OFFICE
CERTIFICATE OF CORRECTION

PATENT NO.   : 5,072,891
DATED        : Dec. 17, 1991
INVENTOR(S)  : Robert J. Cavalleri, et al It is certified that error appears in the above-indentified patent and that said Letters Patent is hereby corrected as shown below:

Column 1, line 6, insert the following:
--"this invention was made with Government support under contract NAS8-37322 awarded by NASA. The Government has certain rights in this invention."--

Signed and Sealed this

Seventeenth Day of May, 1994

Attest:

BRUCE LEHMAN

*Attesting Officer*        *Commissioner of Patents and Trademarks*